Aug. 18, 1959     J. V. SCHMITZ ET AL     2,900,277
PROCESS OF APPLYING PROTECTIVE COATINGS
BY MEANS OF HIGH ENERGY ELECTRONS
Filed Feb. 8, 1955
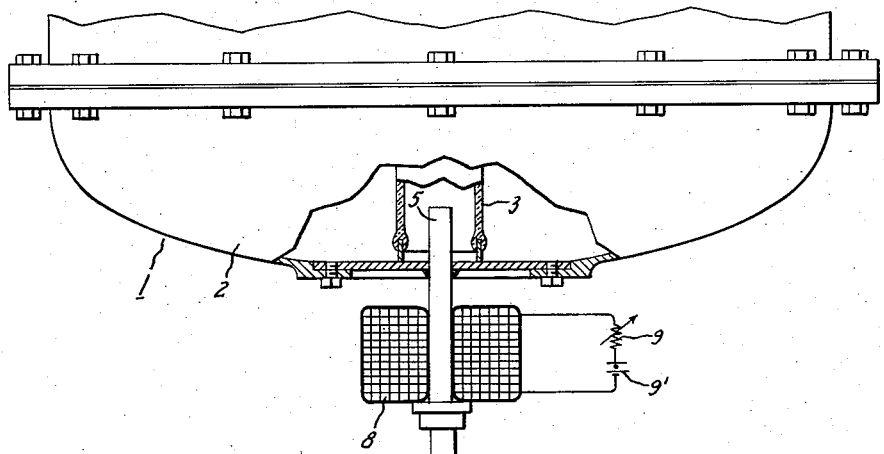
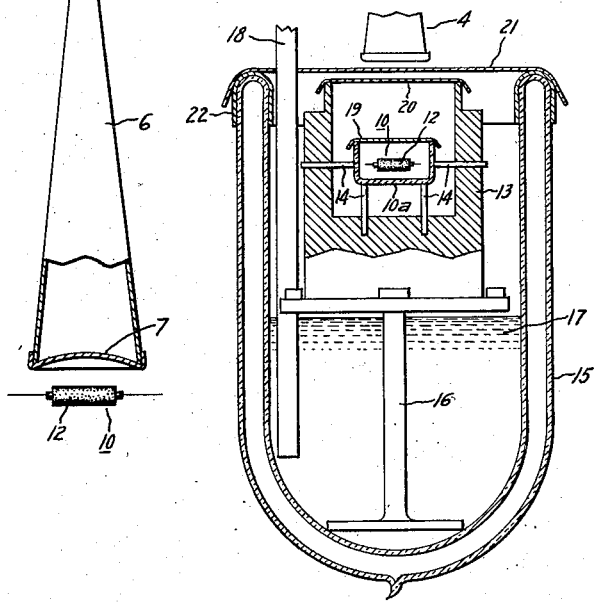
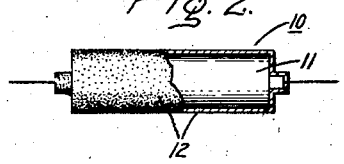
Inventors:
John V. Schmitz,
Elliott J. Lawton,
by Paul A. Frank
Their Attorney.

United States Patent Office 2,900,277
Patented Aug. 18, 1959

2,900,277

PROCESS OF APPLYING PROTECTIVE COATINGS BY MEANS OF HIGH ENERGY ELECTRONS

John V. Schmitz, Anaheim, Calif., and Elliott J. Lawton, Schenectady, N.Y., assignors to General Electric Company, a corporation of New York Application February 8, 1955, Serial No. 486,838

3 Claims. (Cl. 117—93)

This invention relates to a method of applying a protective resinous coating to surfaces by the polymerization of polymerizable organic compounds with high energy electrons or high voltage cathode rays and, more particularly, to the coating or encapsulation of heat-sensitive articles, such as resistors, capacitors, transformers, transistors, diodes, etc., with polymerizable organic compounds, by the polymerization of such compounds by irradiation with high energy electrons or high voltage cathode rays.

Heretofore, the polymerization of polymerizable organic compounds, e.g., vinyl compounds, has been initiated by one, or a combination, of three means—(1) chemical reagents such as peroxides, azo- compounds, etc., (2) application of heat, and (3) irradiation by light. While these means have been successfully employed for commercial purposes, they have been beset by definite disadvantages. For example, the use of chemical reagents introduces undesirable by-products in the finally polymerized compositions, which are often difficult to remove and may deleteriously affect the properties of the polymerized materials. In addition, the application of heat alone for polymerization purposes is slow and impractical for purposes such as the coating or encapsulation of heat-sensitive materials such as resistors, capacitors, transformers, transistors, diodes, etc., since their properties are destroyed by the application of heat. Polymerization by light irradiation generally gives poor yields and is applicable to few polymerizable compounds, and is particularly unsatisfactory for the present purpose because polymerization by light irradiation generally is limited to the surface of the coating material rather than throughout the body.

In the manufacture of certain of the aforementioned articles, it is desirable to enclose such articles with a resinous material. While germanium diodes, for example, may be manufactured inexpensively using cases composed of phenolic resin, these units tend to deteriorate rapidly in a high humidity atmosphere unless they are moisture sealed. Up to the present time, no entirely satisfactory method has been found for sealing units of this type. The most promising methods involve the coating or encapsulation of the entire structure with a polymeric material. A disadvantage of this method is that most polymerizations require the application of heat to attain reasonable curing rates. However, materials such as germanium are quite heat-sensitive and are therefore not readily susceptible to coating or encapsulation by this means.

Unexpectedly, we have found that in the manufacture of articles requiring the coating or encapsulation of a heat-sensitive material, the coating or encapsulation can be accomplished rapidly and without impairing the properties of the heat-sensitive material by surrounding the material with a monomeric compound and polymerizing the monomer by irradiation with high energy electrons or high voltage cathode rays.

Briefly stated, the present invention has application to the coating or encapsulation of articles containing heat-sensitive materials of the foregoing description by the polymerization of olefinic organic compounds containing at least one terminal $CH_2=C<$ grouping, and selected from the class consisting of monohydric and polyhydric alcohol esters of acrylic and methacrylic acids, acrylonitrile, mixtures of the aforesaid acrylic and methacrylic acid esters, mixtures of styrene and an unsaturated alkyd resin, mixtures of diallyl phthalate and an unsaturated alkyd resin, and mixtures of (a) monohydric alcohol esters of acrylic and methacrylic acids and (b) an unsaturated alkyd resin. Also included within the scope of this invention are the organopolysiloxanes disclosed and claimed in Rochow Patents 2,258,218 to 2,258,222, inclusive, issued October 7, 1941 and assigned to the assignee of the present invention. By irradiating articles comprising these monomers and a heat-sensitive material in a non-gaseous state with high energy electrons at a dose accumulation rate not exceeding $1 \times 10^7$ roentgens per second, coating or encapsulation of the heat-sensitive material is accomplished by means of fast and efficient polymerization of the monomer without deleteriously affecting the properties of the heat-sensitive material.

The features of the invention desired to be protected herein are pointed out with particularity in the appended claims. The invention itself, together with further advantages resulting from the process, may best be understood by reference to the following description, taken in connection with the accompanying drawings, in which Fig. 1 is a partially sectionalized, simplified view of accelerator apparatus useful in practicing the invention; Fig. 2 is a view of an electrical element partly in section, showing the coating; and Fig. 3 is a partially sectionalized view of alternative apparatus which is employed to obtain a desired result in accordance with the invention.

Referring particularly now to Fig. 1, there is shown high voltage apparatus 1 capable of producing a beam of high energy electrons for irradiating monomers used for coating or encapsulating purposes in accordance with the invention. High voltage apparatus 1 may be of the type disclosed in U.S. Patent 2,144,518 patented by Willem F. Westendorp on January 7, 1939, and assigned to the assignee of the present invention. In general, this apparatus comprises a resonant system having an open magnetic circuit inductance coil (not shown) which is positioned within a tank 2 and energized by a source of alternating voltage to generate a high voltage across the extremities. At the upper end (not shown) of a sealed-off, evacuated, tubular envelope 3, is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of high voltage apparatus 1 may be found in the aforementioned Westendorp patent and "Electronics," volume 16, pages 128 to 133 (1944).

To permit utilization of the high energy electrons accelerated down envelope 3, there is provided an elongated metal tube 4, the upper portion 5 of which is hermetically sealed to tank 2, as illustrated, by any convenient means such as silver solder. The lower portion 6 of tube 4 is conical in cross section to permit an increase in angular spread of the electron beam. The emergence of high energy electrons from tube 4 is facilitated by an end window 7 which may be hermetically sealed to tube 4 by means of silver solder. End window 7 should be thin enough to permit electrons of desired energy to pass therethrough, but thick enough to withstand the force of atmospheric pressure. Stainless steel of about 0.002 inch thickness has been found satisfactory for use with electron energies of at least 230,000 electron volts or greater. Beryllium and other materials of low stopping power may also be employed with efficacy. By forming end window 7 in arcuate shape as shown, greater strength for resisting the force of atmospheric pressure may be obtained for a given window thickness. Desired focusing of the accelerated electrons may be secured by a magnetic field generating winding 8 energized by a source of direct current 9' through a variable resistor 9.

In the polymerization of monomeric organic compounds employed as coating or encapsulating materials for articles containing a heat-sensitive element with the high voltage apparatus 1, an electrical element 10, shown in Fig. 2, containing a heat-sensitive component 11 and having a coating of a liquid monomer 12 may be supported in the path of the electrons emerging from end window 7 as illustrated. The high energy electrons penetrate the monomer 12 to a depth dependent upon their energy and initiate polymerization of the monomer with the accompanying encapsulation of the heat-sensitive elements with solid polymer to form an integral unit.

In accordance with the invention, the monomeric compound 12 may comprise monohydric and polyhydric alcohol esters of acrylic and methacrylic acids. Monohydric alcohols which may be employed in the preparation of esters of acrylic and methacrylic acids are, for example, methyl, ethyl, propyl, isopropyl, butyl, 2-ethylhexyl, decyl, etc. Polyhydric alcohols which may be employed also in the preparation of esters of acrylic and methacrylic acids are, for example, ethylene glycol, diethylene gylcol, dipropylene glycol, pentamethylene glycol, tetraethylene glycol, glycerine, sorbitol, etc. Some of the esters prepared from the foregoing alcohols are, for example, ethyl acrylate, ethyl methacrylate, butyl acrylate, methyl acrylate, methyl methacrylate, dipropylene glycol dimethacrylate, tetraethylene glycol diacrylate, pentamethylene glycol dimethacrylate, glyceryl trimethacrylate, tetraethylene glycol dimethacrylate, etc.

The monomeric compound 12 may also comprise acrylonitrile and mixtures of an unsaturated alkyd resin with either styrene or diallyl phthalate. Unsaturated alkyd resins employed in the practice of the present invention are those commonly obtained by effecting a reaction between a polyhydric alcohol, many examples of which are stated above, and an alpha unsaturated alpha, beta dicarboxylic acid or anhydride, which for brevity will hereinafter be referred to as "unsaturated acid." Examples of such unsaturated acids are maleic acid or anhydride, fumaric acid, itaconic acid or anhydride, mesaconic acid, etc. Modification of the unsaturated alkyd resin with non-polymerizable dicarboxylic acids, e.g., adipic, sebacic, phthalic, etc. acids, is also intended to be included within the scope of the term "unsaturated alkyd resin."

While the invention has been described to this point with particular reference to encapsulation by polymerization at ambient temperatures, we have found in the main that the polymerization temperature is dependent upon the element being encapsulated and may extend up to a point just short of which damage of the heat-sensitive element is realized. We have also found that the percent polymerization for a given total dose administered at a given dose accumulation rate is furthermore dependent upon the initial temperature of the monomer. Thus, if the monomer is irradiated with high energy electrons, the percent polymerization increases with increases in the initial temperature. Apparatus for maintaining the monomer undergoing irradiation at a temperature below ambient is illustrated in Fig. 3, wherein numerals employed hereinbefore are utilized to identify like elements. Receptacle 10a containing an element 10 having a heat-sensitive component (not shown) and a coating 12 is supported with a cup-shaped member 13 of conducting material, such as aluminum, by means of a plurality of posts 14 which may consist of wood. Cup-shaped member 13 is positioned within a thermally insulated vacuum bottle 15, upon a pedestal 16 constructed of a material such as a molding compound of phenol-aldehyde resin. By partially filling the vacuum bottle 15 with a cooling medium 17, such as liquefied nitrogen or air through a filling tube 18, monomer 12 may be maintained at a desired temperature below ambient, and by slowly adding the cooling medium to compensate for evaporation, the temperature may be controlled. For the purpose of preventing atmospheric turbulence within vacuum bottle 15, aluminum foil sheets 19, 20 and 21 are respectively positioned over receptacle 10a, 13 and vacuum bottle 15, as illustrated. A sheet 22 of lead foil is placed over the edge of vacuum bottle 15 to protect it from the damaging effects of radiation.

Irradiation of the monomer in the solid state fails to produce significant polymerization. We have observed, however, that if the monomer is irradiated in the solid state and then warmed to a liquid state, polymerization unexpectedly occurs rapidly. In the encapsulation of heat-sensitive elements of the type hereinbefore described, this is a desirable feature. For example, if the heat-sensitive element is positioned in the liquid monomer and the monomer frozen to the solid state by the foregoing means, and the frozen monomer thereafter irradiated in the solid state and then warmed to a liquid state, polymerization unexpectedly occurs rapidly, with resulting encapsulation of the heat-sensitive element maintained in position. This "delayed polymerization" phenomenon is obtainable and may be availed of with all the above-mentioned classes of monomers in the encapsulation of heat-sensitive elements.

The polymerization of the monomer in the liquid state is inhibited at the surface by oxygen; hence, it is advantageous to place the monomer in an inert atmosphere or in vacuo during irradiation. Nitrogen has also proven satisfactory as an atmosphere in which the monomer may be placed.

In order that those skilled in the art may better understand how the present invention may be practiced, the following example is given by way of illustration and not by way of limitation. The apparatus used for effecting the polymerization described below is that shown in Fig. 1, and particularly described above.

EXAMPLE 1

Several germanium diodes were coated with a co-reaction product of 30% by weight styrene and 70% by weight of a propylene glycol fumarate phthalate unsaturated alkyd composition. The coated diodes were then irradiated, at ambient temperatures, with 800 kvp. (kvp. refers to the peak kilovolts generated by the inductance coil within high voltage apparatus 1 and thus is a measure of the energy of electrons emerging from window 7) cathode rays at various dose levels and for various periods of time. The irradiation time, in seconds, and the dose for each are shown in Table I. The parameter measured was the reverse current at −50 volts D.-C. and the values shown in Table I are in microamperes.

Table I

| Diode No. | Duration of Irradiation in Seconds | Dose | Reverse Current in Microamperes |
|---|---|---|---|
| 1 | 3 | $1.1 \times 10^6$ | 230 |
| 2 | 7 | $2.5 \times 10^6$ | 90 |
| 3 | 17.5 | $6 \times 10^6$ | 60 |
| 4 | 200 | $1 \times 10^6$ | 85 |

The reverse current measurements for each of the diodes coated and encapsulated in accordance with the invention lie in an acceptable range and thereby show that the properties of the germanium element were not impaired by the irradiation.

Moisture resistance tests were conducted on germanium diodes coated with a similar co-reaction product of styrene and an unsaturated alkyd resin. This test was conducted in a humidity chamber maintained at a constant relative humidity of approximately 95%. The temperature is raised from room temperature to about 70° C. in a 3-hour period. The temperature is then allowed to drop back to room temperature and the temperature is thereafter again raised to about 70° C. in a 3-hour period. The temperature is again allowed to drop to room temperature and is kept at room temperature at the same relative humidity, 95% for approximately 12 hours making a total of 24 hours or 1 humidity cycle. At the end of each 24-hour cycle, the reverse current was measured, the parameter measured being the reverse current at −50 volts D.-C. and the values, shown in Table II, are in microamperes. In Table II, diode 4 is the same as diode 4 in Table I.

*Table II*

| Diode No. | Duration of Irradiation in Seconds | Dose | Reverse Current After the Number of Cycles Shown | | | | | | |
| --- | --- | --- | --- | --- | --- | --- | --- | --- | --- |
| | | | 0 | 1 | 2 | 3 | 4 | 7 | 8 |
| 4 | 200 | $1 \times 10^6$ | 85 | 80 | 95 | 110 | 300 | 1,350 | 820 |
| 5 | 17.5 | $6 \times 10^6$ | 330 | 345 | 310 | 450 | 580 | | |

The data of Table II indicates that the humidity resistance of germanium diodes encapsulated in accordance with the invention are within an acceptable range. The data further indicates an improvement trend with longer periods of irradiation.

While the present invention has been described in more detail with respect to a copolymer of styrene and an unsaturated alkyd resin, it is obvious that the invention may be practiced with other monomeric polymerizable compositions of the class herein disclosed. Polymerization of these materials by a similar method is more fully disclosed and claimed in application Serial No. 291,541, Schmitz and Lawton filed June 3, 1952, and assigned to the assignee of the present invention, which application by reference is made a part of this application.

What we claim as new and desire to secure by Letters Patent of the United States is:

1. The process of encapsulating a heat-sensitive article selected from the class consisting of resistors, capacitors, transformers, transistors, and diodes with a protective resinous coating which comprises the steps of coating said element with a liquid composition comprising a polymerizable monomeric compound and thereafter polymerizing said composition by means of high energy electrons.

2. The process of encapsulating a heat-sensitive article comprising a germanium component with a protective resinous coating which comprises the steps of coating said germanium component with a liquid composition comprising a polymerizable monomeric compound and thereafter polymerizing said composition by means of high energy electrons.

3. In the manufacture of a germanium diode without deleterious effect upon the germanium component, the steps which comprise coating the germanium component with a protective resinous coating comprising a liquid composition comprising a polymerizable monomeric compound and thereafter polymerizing said composition by means of high energy electrons.

References Cited in the file of this patent

UNITED STATES PATENTS

| | | |
| --- | --- | --- |
| 2,563,503 | Wallace, Jr. | Aug. 7, 1951 |
| 2,748,288 | Saulnier | May 29, 1956 |
| 2,763,609 | Lewis et al. | Sept. 18, 1956 |

OTHER REFERENCES

Sparks: "Scientific American" (July 1952), page 32.

Charlesby (I): "Proc. Royal Soc.," London (Nov.-Dec. 1952) A, vol. 215, pages 187–212.

Charlesby (II): "Nucleonics" (June 1954), pages 18–25.

Charlesby (III): "Nature" (Apr. 14, 1954), No. 4406, pages 679–680.

Chem. & Eng. News (Oct. 4, 1954) page 3964.

Atomics, "Radiation Research in Britain," June 1956, pages 211–214, page 214 relied on.